United States Patent [19]

Simmons et al.

[11] Patent Number: 5,178,892
[45] Date of Patent: Jan. 12, 1993

[54] PROCESS FOR THE PREPARATION OF FLAVORING MIXTURES

[75] Inventors: John Simmons, St. Charles, Ill.; Jan Visser, Huizen, Netherlands

[73] Assignee: Unilever Patent Holding B.V., Rotterdam, Netherlands

[21] Appl. No.: 719,304

[22] Filed: Jun. 24, 1991

[30] Foreign Application Priority Data

Jun. 22, 1990 [EP] European Pat. Off. ........ 90306873.2

[51] Int. Cl.$^5$ ...................... A23L 1/226; A23L 1/231
[52] U.S. Cl. .................................... 426/533; 426/534
[58] Field of Search ................................ 426/533, 534

[56] References Cited

U.S. PATENT DOCUMENTS

| 4,604,290 | 8/1986 | Lee et al. | 426/533 |
| 5,043,180 | 8/1991 | Haring et al. | 426/533 |

FOREIGN PATENT DOCUMENTS 0295509 12/1988 European Pat. Off. .
0298552 11/1989 European Pat. Off. .
578311 8/1976 Switzerland .

OTHER PUBLICATIONS

Jung, et al., "Effect of $\alpha$-, $\gamma$-, and $\delta$-Tocopherols on Oxidative Stability of Soybean Oil", Journal of Food Science vol. 55, No. 5, 1990, pp. 1464–1465.
Patent Abstract of Japan, vol. 5, No. 75 (1981).

*Primary Examiner*—Joseph Golian
*Attorney, Agent, or Firm*—Cushman, Darby & Cushman

[57] ABSTRACT

The invention concerns a process for the preparation of flavoring mixtures by heating of fatty acids or fatty acid derivatives with an oxidizing agent in the presence of at least 0.1% by weight of an antioxidant. Polyunsaturated fatty acids or animal or vegetable fats which are rich in such acids are preferred as starting materials. The preferred oxidizing agent is oxygen. The oxidation mixtures obtained are rich in aldehydes and can be used to improve the organoleptic properties of foods.

17 Claims, No Drawings

PROCESS FOR THE PREPARATION OF FLAVORING MIXTURES

The invention concerns a process for the preparation of flavoring mixtures through controlled oxidation of fatty acids. More particularly, the invention concerns a process for the preparation of such mixtures through oxidation of fatty acids or fatty acid derivatives in the presence of anti-oxidants. The invention also concerns flavoring mixtures obtainable thereby and flavoring compositions and foods containing these flavoring mixtures.

It is known in the art that the specific flavor of animal and vegetable fats and oils depends on the presence of minute quantities of compounds derived from oxidative degradation of these fats and oils. Saturated and unsaturated aliphatic aldehydes are among such oxidation products. From I. Hornstein in "The chemistry and Physiology of Flavors", The AVI Publishing Company, Inc. 1967, Chapter 10, it is known that the species-specific flavor of animal fats may be enhanced by heating in air. From J. E. Kinsella, Food Technology, May 1975, pp. 82-98 it is known that aliphatic aldehydes are important contributors to the flavor of butter, but that they give "oxidized" off-flavors when they accumulate above critical concentrations. Similar problems are known for other fats and oils, and anti-oxidants are often added to prevent undue oxidation, see e.g.: V. N. Wade et al, Milchwissenschaft 41 (8), 1969, pp.479-482 and Ch. N. Rao et al, Asian J. Dairy Res. 3 1984, pp. 127-130. EP 172 275 describes a process for preparing butter-like or animal-type flavorings by heating a mixture of enzyme modified milk fat and another fatty material. EP 298 552 describes the preparation of a flavor concentrate for imparting a butter-like flavor, prepared by oxidizing butter fat.

The oxidized butter fats obtained thereby contain a few ppm's of aliphatic aldehydes with up to 9 carbon atoms.

On the other hand, aliphatic aldehydes and other compounds derived from fat degradation are known to play an important role in the flavor industry and are added in small quantities to a number of flavoring compositions and foods to impart or strengthen desirable flavor qualities. Therefore, there is a need for flavoring mixtures which are rich in such compounds.

It has now been found that flavoring mixtures which are rich in various aliphatic aldehydes and other flavor compounds derived from fat degradation may be obtained through controlled oxidation of fatty acids or fatty acid derivatives in the presence of anti-oxidants. The oxidation mixtures may either be used as such as flavoring mixtures, or the aldehydes and other compounds may be concentrated or separated from the oxidation mixtures to prepare more concentrated flavoring mixtures.

According to the invention a fatty acid or a fatty acid derivative is heated in the presence of an oxidizing agent and an anti-oxidant for a sufficient time and to a sufficiently high temperature to obtain a desired level of flavor compounds in the oxidation mixture.

Fatty acids as used in this invention are aliphatic carboxylic acids having between 4 and 26 carbon atoms, preferably more than 14 carbon atoms. Mono- and especially poly-unsaturated fatty acids or mixtures which are rich in these acids are preferred. Fatty acid derivatives comprise fatty acid salts, especially those of alkali or alkali earth metals, and fatty acid esters of mono- or polyhydric alcohols. Examples of such esters are ethyl esters, esters of long chain aliphatic alcohols such as those found in certain natural waxes (like beeswax) and oils (like jojoba oil) and mono-, di- or triesters of glycerol such as animal or vegetable solid or liquid fats (the latter are usually referred to in the art as oils). Examples of animal fats are: tallow, milk fat, lamb fat, chicken fat, egg fat and fish oils. Examples of vegetable fats are: olive oil, sunflower oil, coconut oil, peanut oil, sesame oil, palm oil, palm kernel oil, linseed oil, safflower oil, soy bean oil, avocado oil, almond oil, hazelnut oil, evening primrose oil, etc. Fats which are relatively rich in unsaturated, particularly poly-unsaturated, fatty acids are preferred. Also preferred are fats containing branched chain fatty acids, which are present in relatively small quantities in some fats. Animal or vegetable fats may either be used as such in the process of the invention or they may first be subjected to chemical or enzymatic hydrolysis. In that case either the fatty acids are first isolated from the hydrolysis mixture, or the hydrolysis mixture as such is used in the process of the invention. Depending on the reaction conditions used for the hydrolysis, this reaction may even be combined with the process of the invention. Particularly preferred fatty acids are linoleic, linolenic and arachidonic acid; particularly preferred fats are those which are rich in one or more of these fatty acids.

Oxidizing agents used in the process may be oxygen, hydrogen peroxide (or a source thereof), ozone, oxidizing metal ions such as $Cu^{2+}$ or $Fe^{3+}$, or suitable combinations of these oxidizing agents. When oxygen is used it may be either pure oxygen or a mixture of oxygen with an inert gas. For reasons of convenience air is preferred as the oxygen source.

Anti-oxidants suitable for the process of the invention are either single compounds, or mixtures of compounds which are generally recognized to prevent or retard oxidation. Preferred are anti-oxidants which are permitted by food regulations to be present in or added to foods, in particular in/to fats. Especially preferred are butylated hydroxytoluene, butylated hydroxy-anisole, gallate esters, tocopherols, tocotrienols, ascorbic acid and its salts and esters such as ascorbyl palmitate. Particularly preferred are tocopherols. The anti-oxidant should be present in a quantity of at least 0.1% by weight based on the quantity of fatty acid or fat. Preferably, the anti-oxidant is present in a quantity of 0.5% or more, particularly 1% or more. It could be as high as 100% but higher quantities than 50% are rarely useful. These anti-oxidant quantities refer to the quantity actually added to the reaction mixture over and above any anti-oxidant which may already be present naturally in the fatty acid or fat. Generally such anti-oxidants are present naturally only in quantities which are negligible compared to the quantities used in this invention.

The temperature at which the controlled oxidation is carried out is not critical. To complete the process within a reasonable time span preferably a temperature of 30° C. or more, more preferably 50° C., particularly 65° C. or more is used. With special precautions temperatures as high as 350° C. could be used, but in most cases the quality of the flavor mixtures obtained is affected due to undesirable side reactions at temperatures higher than 180° C. The process is generally carried out below 125° C.

The heating time is dependent on the temperature used and the level and ratio of aldehydes desired. A heating time of only 30 sec may be sufficient at very high temperatures, whereas at a temperature near 30° C. heating times up to 100 hours may be necessary. Generally heating times between 1 and 20 hours are satisfactory.

The controlled oxidation may be carried out on the fatty acid, fatty acid mixture or fat as such, or a suitable reaction medium may be added. Particularly suitable reaction media are water and other polar solvents e.g. polyols such as glycerol and propylene glycol, or solutions of an alkali or alkali earth metal salt of a mineral acid such as sodium or potassium chloride in any of these solvents. Such reaction media can be used in quantities of up to 95%, particularly up to 50% by weight of the total oxidation mixture. Preferably a quantity of 20% or more is used. The oxidation reaction can be carried out at a pH between 1 and 10, preferably the pH should be between 2.5 and 8.

The reaction may be carried out by simply heating the reaction mixture in an open or closed reaction vessel, whilst agitating it by any suitable means such as stirring, shaking, vibration, etc. A closed vessel should always be used if the reaction temperature is above the boiling point at atmospheric pressure of the reaction medium. When an open vessel is used, care should be taken not to lose volatile aldehydes in the atmosphere, e.g. by using a reflux condensor or a cold trap. Oxygen may be conveniently supplied by bubbling an oxygen containing gas mixture such as air through the reaction mixture, or by dispersing atmosheric oxygen through the reaction mixture by any of the agitating means mentioned above.

As outlined above, the oxidation mixtures obtained by the process of the invention are valuable flavor mixtures due to their high content of aliphatic flavor aldehydes and other flavor components. Such aldehydes include: n-pentanal, n-hexanal, n-heptanal, n-nonanal, cis-3-hexenal, trans-2-nonenal, trans-2-decenal, cis,-trans- and trans,trans-2,4-heptadienal, cis,trans- trans,-trans- and trans,cis-2,4-decadienal. Other flavor components may include aliphatic ketones, lactones and relatively short chain fatty acids. Which of these aldehydes and other components are present in a particular flavor mixture and in which quantities and ratios depends on the fatty acid or fat starting material, taking into account that the results of mixtures of fatty acids or fats can be different from the sum of the results of the separate components, due to preferential oxidation of certain fatty acids over others. The composition of the flavor mixtures is also dependent on the type and quantity of anti-oxidant and on the reaction conditions used such as time, temperature, mixing efficiency or amount of oxygen supplied. By changing these variables the flavor properties of the flavor mixtures may be varied to suit specific needs. In most cases it is preferred that the reaction medium is saturated with oxygen during the reaction. The process of the invention is particularly useful in providing flavoring mixtures with a relatively high content of poly-unsaturated aldehydes.

The oxidation mixtures obtained as decribed above can be used as such, but they can also be converted into more concentrated flavoring mixtures by separating the flavor components from part or all of the fatty acids or fat which is still present, or they can be fractionated to give other flavoring mixtures containing different quantities and/or ratios of flavor components, or even to give single flavor components. Such separation, concentration, or fractionation may be carried out using methods known in the art such as distillation, steam-distillation, co-distillation with a suitable solvent such as triacetine, diacetine, or triethylcitrate, fat removal by cristallisation from a suitable solvent such as isopropanol, extraction e.g. with ethanol, chromatographic techniques, etc.

The flavoring mixtures according to the invention may be added as such to foods or they may first be combined with a suitable diluent or carrier or be converted into powdered products e.g. by spray drying or other encapsulation techniques known in the art. In many cases it is advantageous to combine the flavoring mixtures with other flavoring ingredients into flavoring compositions. The flavoring mixtures may be very suitably combined with flavoring ingredients obtained by Maillard- or Amadori-type reactions between sugars and aminoacids and/or sulphur compounds. Such combination may be made after the Maillard-reaction has taken place. In another embodiment the starting materials for the flavoring mixture of the invention may be added before or during the Maillard reaction so as to have the Maillard reaction and the fatty acid oxidation taking place simultaneously.

The term "flavoring composition" is used here to mean a mixture of flavoring ingredients of natural and-/or synthetic origin, if desired dissolved in a suitable solvent or mixed with a powdered substrate, or processed into a powdered product, which is used to impart a desired flavor to foods. The term "food" is used here to mean a solid, semi-solid or liquid product intended for oral consumption by man or animals. Flavoring ingredients which may be used in conjunction with the flavoring mixtures according to the invention are well known in the art and are mentioned e.g. in S. Arctander, Perfume and Flavor Materials of Natural Origin, Elizabeth, N.J., U.S.A. (1969), in T. E. Furia et al., CRC Fenaroli's Handbook of Flavor Ingredients, 2nd ed., Cleveland, CRC Press Inc. (1975), in H. B. Heath, Source Book of Flavors, The Avi Publishing Co. Inc., Westport, Conn. (1981) and in "Flavor and Fragrance Materials—1989", Allured Publ. Corp. Wheaton, Ill., U.S.A.

The flavoring mixtures according to the invention or flavoring compositions containing them are particularly suitable to improve the organoleptic quality of foods and food components which need, or already have a fatty, creamy or dairy-type flavor, such as soups, sauces, gravies, dressings, meat products, snacks, shortenings, margarines, spreads, dairy-type products including products containing butter fat substitutes, bakery products, confectionary products. Some oxidation mixtures of the invention may even be used as ingredients with improved odour properties in perfumery and cosmetics.

The invention is illustrated by the following examples but not in any way limited thereto.

EXAMPLES

In all tables the anti-oxidant content is in % by weight and the aldehyde content in ppm by weight of the fatty acid(s) or fat.

EXAMPLE 1

The following general procedure was used for preparing the oxidation mixtures of tables 1–4 using the indicated fatty acids or acid mixtures:

To a mixture of 50 g fatty acid(s) and 25 g water in a 300 ml Erlenmeyer flask is added the quantity of Tocopherol concentrate 4-50 (a 50% solution in palm oil of a mixture of tocopherols which is rich in α-tocopherol, marketed by Jan Dekker, Wormerveer, The Netherlands) to supply the indicated concentration of tocopherols relative to the fatty acid(s) in the oxidation mixture. The mixture is shaken under air in a laboratory shaker whilst heating to 85° C. for 8.0 hours. After cooling the aqueous layer was separated and the fatty acid layer was analysed for its aldehyde content by gas chromatography, using an external standard, on a Carlo Erba GC 6000 equipped with a 25 m×0.3 mm WCOT fused silica column FFAP CB df=0.29 μm, of Chrompack International B.V., Middelburg, The Netherlands; column temp: programmed (4° C./min) 80°-240° C.; detector temp: 260° C.; injector temp: 250° C.; carrier gas: helium. The results are outlined in the tables 1-4 below

TABLE 1

| Linoleic Acid; 85° C.; 8 hours | | | | | | |
|---|---|---|---|---|---|---|
| tocopherol | 0.25 | 0.50 | 1.00 | 2.00 | 4.00 | 8.00 |
| hexanal | 80 | 80 | 100 | 120 | 50 | 70 |
| c,t-2,4-decadienal | 60 | 60 | 70 | 80 | 100 | 120 |
| t,t-2,4-decadienal | 160 | 140 | 150 | 160 | 100 | 100 |

TABLE 2

| Linolenic Acid; 85° C.; 8 hours | | | | | | |
|---|---|---|---|---|---|---|
| tocopherol | 0.25 | 0.50 | 1.00 | 2.00 | 4.00 | 8.00 |
| cis-3-hexenal | 50 | 50 | 70 | 100 | 170 | 390 |
| c,t-2,4-heptadienal | 60 | 60 | 140 | 160 | 520 | 830 |
| t,t-2,4-heptadienal | 100 | 90 | 120 | 120 | 200 | 300 |

TABLE 3

| Oleic Acid; 85° C.; 8 hours | | | | | | |
|---|---|---|---|---|---|---|
| tocopherol | 0.25 | 0.50 | 1.00 | 2.00 | 4.00 | 8.00 |
| nonanal | 40 | 60 | 60 | 70 | 60 | 50 |
| t-2-decenal | 60 | 50 | 50 | 60 | 50 | 50 |

TABLE 4

| Oleic:Linoleic:Linolenic acid = 1:1:1; 85° C.; 8 hours | | | | | | |
|---|---|---|---|---|---|---|
| tocopherol | 0.25 | 0.50 | 1.00 | 2.00 | 4.00 | 8.00 |
| hexanal | 60 | 100 | 90 | 110 | 70 | 120 |
| c-3-hexenal | 20 | 30 | 30 | 50 | 130 | 210 |
| nonanal | 20 | 40 | 30 | 40 | 30 | 40 |
| c,t-2,4-heptadienal | 20 | 30 | 30 | 60 | 240 | 290 |
| t,t-2,4-heptadienal | 40 | 40 | 40 | 50 | 110 | 120 |
| t-2-decenal | 30 | 40 | 30 | 40 | 40 | 40 |
| c,t-2,4-decadienal | 40 | 60 | 50 | 50 | 90 | 80 |
| t,t-2,4-decadienal | 110 | 170 | 130 | 110 | 90 | 80 |

EXAMPLE 2

Four 20 g 1:1:1 mixtures of oleic, linoleic and linolenic acid with 10 g water were oxidized in the presence of the 4 different anti-oxidants listed in table 5 below, using the procedure of Example 1. In each case the anti-oxidant concentration was 4% based on the weight of the fatty acids. "α-tocopherol" was Tocopherol concentrate 4-50. "δ-Tocopherol" was obtained from Jan Dekker, Wormerveer, The Netherlands and is a tocopherol mixture which is rich in δ-tocopherol. The resulting oxidation mixtures were analysed for their aldehyde content and the results are presented below.

TABLE 5

| Fatty acid mix 1:1:1; 85° C., 8 hours | | | | |
|---|---|---|---|---|
| antioxidant | BHA | C8-Gallate | δ-tocopherol | α-tocopherol |
| hexanal | 230 | 140 | 130 | 220 |
| c-3-hexenal | 150 | 80 | 60 | 140 |
| nonanal | 50 | 60 | 80 | 70 |
| c,t-2,4-heptadienal | 190 | 50 | 70 | 180 |
| t,t-2,4-heptadienal | 100 | 50 | 60 | 120 |
| tr-2-decenal | 80 | 60 | 70 | 90 |
| c,t-2,4-decadienal | 190 | 60 | 110 | 190 |
| t,t-2,4-decadienal | 210 | 50 | 150 | 270 |

EXAMPLE 3

Three fatty acid mixtures according to Example 2 were oxidized as mixtures of 20 g fatty acids with 10 g of either water, 10% by weight aqueous NaCl solution or 25% NaCl solution respectively, using the procedure of Example 1. The mixtures all contained tocopherol (added as Tocopherol concentrate 4-50) in a concentration of 4% by weight of the fatty acids. The oxidation mixtures obtained were analysed and the results are given in table 6 below.

TABLE 6

| Fatty acid mix 1:1:1; 85° C., 8 hours | | | |
|---|---|---|---|
| aqueous phase | water | 10% NaCl | 25% NaCl |
| hexanal | 220 | 130 | 110 |
| c-3-hexenal | 140 | 70 | 50 |
| nonanal | 70 | 60 | 60 |
| c,t-2,4-heptadienal | 180 | 70 | 70 |
| t,t-2,4-heptadienal | 120 | 70 | 60 |
| t-2-decenal | 90 | 60 | 60 |
| c,t-2,4-decadienal | 190 | 120 | 120 |
| t,t-2,4-decadienal | 270 | 210 | 180 |

EXAMPLE 4

Mixtures of 20 g peanut oil and 10 g water were oxidized using the procedure of Example 1, in the presence of Tocopherol concentrate 4-50 in quantities to give the tocopherol concentrations indicated in table 7. The aldehyde contents are given below.

TABLE 7

| Peanut oil; 85° C.; 8 hours | | | |
|---|---|---|---|
| tocopherol | 0.1 | 1.0 | 10.0 |
| hexanal | 60 | 130 | 150 |
| nonanal | — | 50 | 20 |
| 2-decenal | — | — | 90 |
| c,t-2,4-decadienal | 460 | 1120 | 1680 |
| t,t-2,4-decadienal | 730 | 1970 | 2160 |

EXAMPLE 5

Mixtures of 20 g sardine oil and 10 g water were oxidized using the procedure of Example 1, in the presence of Tocopherol concentrate 4-50 in quantities to give the tocopherol concentrations indicated in table 8. The aldehyde contents of the oxidation mixtures are presented below in table 8.

A fatty acid mixture was obtained by alkaline hydrolysis of sardine oil followed by acidification and separation of the fatty acids from the remainder of the hydrolysis mixture. 100 g quantities of this fatty acid mixture were oxidized in the presence of different tocopherol concentrations as outlined above. The aldehyde contents of the oxidation mixtures are likewise presented in table 8 under "hydrolysed sardine oil".

TABLE 8

| | (Hydrolysed) sardine oil; 85° C.: 8 hours | | | | | |
|---|---|---|---|---|---|---|
| | Sardine oil | | | Hydr. sardine oil | | |
| tocopherol | 0.1 | 1.0 | 10.0 | 0.1 | 1.0 | 10.0 |
| c-3-hexenal | 230 | 130 | 200 | 300 | 360 | 1180 |
| c,t-heptadienal | 260 | 530 | 1610 | 100 | 190 | 1770 |
| t,t-heptadienal | 240 | 200 | 240 | 120 | 140 | 250 |
| t,c-2,4-decadienal | 220 | 450 | 1260 | 150 | 300 | 1710 |

EXAMPLE 6

Mixtures of 20 g chicken fat and 10 g water were oxidized using the procedure of Example 1, in the presence of Tocopherol concentrate 4–50 in quantities to give the tocopherol concentrations indicated in table 9. The aldehyde contents of the oxidation mixtures are presented below in table 9.

TABLE 9

| | Chicken fat; 85° C.; 8 hours | | | |
|---|---|---|---|---|
| tocopherol | 0.10 | 0.5 | 1.0 | 4.0 |
| hexanal | 80 | 90 | 80 | 110 |
| nonanal | — | 50 | 80 | — |
| 2-decenal | 80 | 70 | 80 | 90 |
| c,t-2,4-decadienal | 280 | 550 | 850 | 1330 |
| t,t-2,4-decadienal | 840 | 1200 | 1690 | 2090 |

EXAMPLE 7

Mixtures of 20 g linseed oil and 10 g water were oxidized using the procedure of Example 1, in the presence of Tocopherol mix 4–50 in quantities to give the tocopherol concentrations (based on the quantity of linseed oil) indicated in table 10.

The aldehyde contents of the oxidation mixtures are presented below in table 10. The oxidation mixture obtained with 50% tocopherol present also contains oxidation products from the palm oil used as the solvent for the tocopherol and present in a quantity half that of linseed oil. However, due to the much larger proportion of poly-unsaturated fatty acids in linseed oil, the oxidation products in the oxidation mixture will be primarily derived from linseed oil fatty acids.

A fatty acid mixture obtained by hydrolysis of linseed oil (commercially available from Sherex Chemicals, Dublin, Eire) was oxidized in 20 g quantities with 10 g water in the presence of different tocopherol concentrations as outlined above. The aldehyde contents of the oxidation mixtures are likewise presented in table 10 under "hydrolysed linseed oil".

TABLE 10

| | (Hydrolysed) linseed oil; 85° C.; 8 hours | | | | | | | |
|---|---|---|---|---|---|---|---|---|
| | hydr. linseed oil | | | | linseed oil | | | |
| tocopherol | 0.1 | 1.0 | 10.0 | 50.0 | 0.1 | 1.0 | 10.0 | 50.0 |
| hexanal | 30 | 30 | 60 | 80 | 100 | 110 | 20 | 70 |
| c-3-hexenal | 70 | 110 | 630 | 880 | 260 | 320 | 280 | 400 |
| nonanal | 10 | 10 | 30 | — | 60 | 70 | — | 140 |
| c,t-2,4-heptadienal | 60 | 90 | 1080 | 1640 | 550 | 2250 | 3700 | 5070 |
| t,t-2,4-heptadienal | 100 | 140 | 410 | 560 | 580 | 860 | 550 | 670 |
| t-2-decenal | 10 | 20 | 10 | — | 70 | 50 | — | — |
| c,t-2,4-decadienal | 20 | 20 | 30 | 50 | 210 | 510 | 370 | 400 |
| t,t-2,4-decadienal | 60 | 70 | 40 | 30 | 550 | 880 | 520 | 450 |

EXAMPLE 8

Mixtures of 20 g chicken fat and 10 g water were oxidized in the presence of different tocopherol concentrations and at different temperatures as described in Example 6, however, using a lower shaking speed. The contents of hexanal and 2,4-decadienals in the oxidation mixtures are presented in table 11.

TABLE 11

| | Chicken fat; different temps.; 8 hours | | |
|---|---|---|---|
| tocopherol | 0.1 | 1.0 | 10.0 |
| | 70° C. | | |
| hexanal | 11 | 13 | 16 |
| c,t-decadienal | 100 | 230 | 240 |
| t,t-decadienal | 230 | 330 | 290 |
| | 85° C. | | |
| hexanal | 12 | 40 | 60 |
| c,t-decadienal | 140 | 490 | 930 |
| t,t-decadienal | 290 | 830 | 1130 |
| | 95° C. | | |
| hexanal | 30 | 30 | 120 |
| c,t-decadienal | 200 | 590 | 1010 |
| t,t-decadienal | 500 | 900 | 1230 |

EXAMPLE 9

Mixtures of 20 g tallow and 10 g water were oxidized using the procedure of Example 1, but at a temperature of 96° C., in the presence of Tocopherol concentrate 4–50 in quantities to give the tocopherol concentrations indicated in table 12 (column 1 corresponds to no tocopherol added). The aldehyde contents of the oxidation mixtures are presented below in table 12.

TABLE 12

| | Tallow; 96° C.; 8 hours | | | |
|---|---|---|---|---|
| tocopherol | 0 | 0.1 | 1.0 | 10.0 |
| hexanal | 10 | 4 | 7 | 10 |
| nonanal | 10 | ±3 | ±2 | ±3 |
| c-2-decenal | 10 | ±4 | ±5 | 11 |
| c,t-2,4-decadienal | 10 | 10 | 30 | 60 |
| t,t-2,4-decadienal | 15 | 15 | 50 | 60 |

EXAMPLE 10

Mixtures of 20 g lard and 10 g water were oxidized using the procedure of Example 1, but at a temperature of 96° C., in the presence of Tocopherol concentrate 4–50 in quantities to give the tocopherol concentrations indicated in table 13 (column 1 corresponds to no tocopherol added). The aldehyde contents of the oxidation mixtures are presented below in table 13.

TABLE 13

| | Lard; 96° C.; 8 hours | | | |
|---|---|---|---|---|
| tocopherol | 0 | 0.1 | 1.0 | 10.0 |
| hexanal | 90 | 17 | 50 | 50 |
| nonanal | 50 | ±10 | 20 | 20 |
| c-2-decenal | 120 | 20 | 50 | 50 |
| c,t-2,4-decadienal | 140 | 30 | 170 | 340 |
| t,t-2,4-decadienal | 220 | 40 | 250 | 430 |

EXAMPLE 11

Two oxidation mixtures were made, each of 120 g of the fatty acid mixture of sardine oil referred to in Example 5, 60 g of water and 24 g of tocopherol concentrate 4–50 (10% tocopherol on fatty acids). Both mixtures were heated at 85° C. for 8 hours in an open vessel equiped with a reflux condensor. One mixture was stirred while air was bubbled through; the other mixture was only stirred so as to aerate the oxidation mixture with oxygen from the atmosphere. After cooling the fatty acid layers were analysed as indicated in Example 1. The results were presented in table 14 below and show the influence of the quantity of oxygen present during the oxidation process.

TABLE 14

| Hydrolysed sardine oil; 85° C.; 8 hours; 10% tocopherol | | |
|---|---|---|
| | bubble | stirr |
| cis-3-hexenal | 90 | 160 |
| c,t-2,4-heptadienal | 380 | 200 |
| t,t-2,4-heptadienal | 110 | 50 |
| t,c-2,4-decadienal | 600 | 200 |

EXAMPLE 12

Mixtures of 20 g sardine oil and 10 g glycerol were oxidized using the procedure of Example 1, but at a temperature of 96° C., in the presence of Tocopherol concentrate 4-50 in quantities to give the tocopherol concentrations indicated in table 15 (column 1 corresponds to no tocopherol added). The aldehyde contents of the oxidation mixtures are presented below in table 15.

TABLE 15

| Sardine oil; 96° C.; 8 hours. | | | | |
|---|---|---|---|---|
| tocopherol | 0 | 0,1 | 1.0 | 10.0 |
| c-3-hexenal | 120 | 90 | 100 | 120 |
| c,t-2,4-heptadienal | 80 | 90 | 190 | 580 |
| t,t-2,4-heptadienal | 90 | 80 | 110 | 100 |
| t,c-2,4-decadienal | 170 | 170 | 300 | 720 |

EXAMPLE 13

Mixtures of 20 g chicken fat and 10 g glycerol were oxidized using the procedure of Example 1, but at a temperature of 96° C., in the presence of Tocopherol concentrate 4-50 in quantities to give the tocopherol concentrations indicated in table 16. The aldehyde contents of the oxidation mixtures are presented below in table 16.

TABLE 16

| Chicken fat; 96° C.; 8 hours | | | |
|---|---|---|---|
| tocopherol | 0.1 | 1.0 | 10.0 |
| hexanal | 9 | 6 | 16 |
| c,t-2,4-decadienal | 90 | 180 | 310 |
| t,t-2,4-decadienal | 170 | 270 | 380 |

EXAMPLE 14

Mixtures of 20 g of fatty acids derived from sardine oil (as described in Example) 5 and 10 g of water, glycerol or propylene glycol respectively were oxidized using the procedure of Example 1, but for a period of 5 hours, in the presence of 4 g Tocopherol concentrate 4-50 (10% tocopherol on fatty acids). The aldehyde contents of the oxidation mixtures are presented below in table 17.

TABLE 17

| Hydrolysed sardine oil, 85° C.; 5 hours | | | |
|---|---|---|---|
| reaction medium | water | glycerol | prop. glycol |
| c-3-hexenal | 380 | 500 | 320 |
| c,t-2,4-heptadienal | 890 | 1060 | 780 |

TABLE 17-continued

| Hydrolysed sardine oil, 85° C.; 5 hours | | | |
|---|---|---|---|
| reaction medium | water | glycerol | prop. glycol |
| t,t-2,4-heptadienal | 100 | 160 | 90 |
| t,c-2,4-decadienal | 1140 | 1260 | 1080 |

EXAMPLE 15

Mixtures of 20 g sardine oil and 10 g water were oxidized in the presence of different tocopherol concentrations and at different temperatures as described in Example 5, however, using a lower shaking speed. The aldehyde contents in the oxidation mixtures are presented in table 18.

TABLE 18

| Sardine oil; different temps.; 8 hours | | | |
|---|---|---|---|
| tocopherol | 0,1 | 1 | 10 |
| | 70° C. | | |
| c-3-hexenal | 90 | 110 | 120 |
| c,t-heptadienal | 170 | 340 | 330 |
| t,t-heptadienal | 100 | 80 | 60 |
| t,c-dekadienal | 330 | 530 | 540 |
| | 85° C. | | |
| c-3-hexenal | 140 | 180 | 210 |
| c,t-heptadienal | 190 | 590 | 1310 |
| t,t-heptadienal | 160 | 210 | 180 |
| t,c-dekadienal | 290 | 840 | 1410 |
| | 96° C. | | |
| c-3-hexenal | 140 | 170 | 150 |
| c,t-heptadienal | 190 | 470 | 1030 |
| t,t-heptadienal | 170 | 210 | 180 |
| t,c-dekadienal | 370 | 560 | 1650 |

EXAMPLE 16

Mixtures 100 g of a fat or fatty acid from the list below, 50 g of water and 2 g of Tocopherol concentrate 4-50 (1% tocopherol on fatty acid or fat) were stirred and heated under reflux for 2 hours, whereafter the aqueous layer was separated. The resulting flavoring mixtures were assessed organoleptically by three trained flavorists and found to be very different from the starting fats and fatty acids. Their comments are presented below:

| | |
|---|---|
| Avocado oil | fresh, sweet, fruity, orange-like |
| Oleic acid | sweet, fatty, fish-like |
| Linoleic acid | sweet, fatty, chicken-like |
| Linolenic acid | green, fatty, aldehydic |
| Peanut oil. | chicken-like |
| Almond oil | fatty, nutty |
| Evening primrose oil | strong buttery, chicken, egg-like |
| Maize oil | chicken-like, fatty |
| Sardine oil | strong fishy, creamy, fatty |
| Butter fat | sweet, creamy, butter/cheese-like |
| Chicken fat | strong chicken-like, fatty |
| Hazelnut oil | fatty, hazelnut-like |
| Coconut oil | like boiled potato skins |
| Sunflower oil | clean chicken-like |
| Jojoba oil | fresh, nutty, sweet and cinnamon-like |
| egg yolk fat | strong egg-like |

EXAMPLE 17

A dry chicken flavoring for soup was prepared by heating the following ingredients to reflux for two hours:

| | |
|---|---|
| Enzymatically treated chicken meat powder | 200 g |
| Glucose | 40 g |
| Cysteine.HCl | 40 g |
| Dry Yeast extract YEP 77 (1) | 400 g |
| Water | 700 g |
| Chicken fat flavoring mixture of Table 9, col. 4 | 100 g |
| Total | 980 g |

Thereafter 200 g Paselli (2) and 500 g water were added and the whole mixture was spray dried on a Buchi laboratory spray drier using an inlet temp of 180° C. and an outlet temp of 90° C.

| A cream soup base was prepared by mixing: | |
|---|---|
| Perfectamyl P10X (2) | 250 g |
| Paselli MD 20 (2) | 300 g |
| Bouillon flavor 1006 (3) | 30 g |
| Yeast extract powder V/OC (1) | 7 g |
| Salt | 50 g |
| Monosodium glutamate powder, laq | 18 g |
| Cream powder DP 30-313 (4) | 325 g |
| Melted chicken fat (37° C.) | 20 g |
| Total | 1000 g |

110 g of this mixture was dissolved in 1 l of boiling water. To this soup base was added 10 g of the dry chicken flavoring obtained above to give a chicken soup with a full bodied chicken flavor.

EXAMPLE 18

A dry fish flavoring for soups and sauces is prepared as follows:

50 g fish powder, 20 g monosodium glutamate 1 aq, 5 g cysteine HCl and 125 g water are mixed and heated under reflux for one hour. 2 g of the treated sardine oil of table 8, column 3 is added and mixed through, followed by 20 g Paselli and the whole mixture is spray dried on a Buchi laboratory spray drier using an inlet temp. of 180° C. and an outlet temp. of 90° C.

EXAMPLE 19

A dry chicken flavoring for ragout is prepared by mixing 30 g enzyme treated chicken meat powder, 4 g cysteine HCl, 0.1 g thym extract powder and 30 g of Condimex 302 (a yeast-based HVP replacer marketed by Quest International). To this mixture is added 1 g of a concentrated flavoring mixture prepared by extracting 100 g of the sunflower oil flavoring mixture of Example 16 three times with 50 ml ethanol followed by concentrating this extract to 10 ml.

We claim:

1. Process for the preparation of flavoring mixtures through oxidation of fatty acids or fatty acid derivatives comprizing heating fatty acids or fatty acid derivatives in the presence of an oxidizing agent and at least 1.5% by weight of an anti-oxidant for a sufficient time and to sufficiently high temperature to obtain a desired level of flavor compounds in the oxidation mixture.

2. Process according to claim 1 wherein a hydrolyzed animal or vegetable fat is used as a source of fatty acids.

3. Process according to claim 1 wherein poly-unsaturated fatty acids or mixtures rich in poly-unsaturated fatty acids are used.

4. Process according to claim 1 wherein the fatty acid derivatives are animal or vegetable fats.

5. Process according to claim 4 wherein a fat which is rich in poly-unsaturated fatty acids is used.

6. Process according to claim 1 wherein oxygen is used as the oxidizing agent.

7. Process according to claim 1 wherein the temperature is kept between 30° and 350° C.

8. Process according to claim 7 wherein the temperature is kept between 50° and 180° C.

9. Process according to claim 8 wherein the temperature is kept between 65° and 125° C.

10. Process according to claim 1 wherein the heating time is 30 seconds–100 hours.

11. Process according to claim 10 wherein the heating time is 1–20 hours.

12. Process according to claim 1 wherein a polar solvent, or a solution of an alkali or alkali earth metal salt of a mineral acid in such solvent, is present as a reaction medium in a quantity of up to 95% by weight of the total oxidation mixture.

13. Process according to claim 12 wherein the polar solvent is water, glycerol or propylene glycol.

14. Process according to claim 13 wherein the quantity of reaction medium is 20–50% by weight of the total oxidation mixture.

15. Process according to claim 1 wherein the anti-oxidant is chosen from butylated hydroxytoluene, butylated hydroxy-anisole, gallate esters, tocopherols, tocotrienols, ascorbic acid or ascorbic acid derivatives.

16. Process according to claim 15 wherein the anti-oxidant is chosen from tocopherols, butylated hydroxy-anisol or gallate esters.

17. Process according to claim 1 wherein flavour components are separated from part or all of the fatty acids or fat in the oxidation mixture.

* * * * *

UNITED STATES PATENT AND TRADEMARK OFFICE
CERTIFICATE OF CORRECTION

PATENT NO. : 5,178,892

DATED : January 12, 1993

INVENTOR(S) : SIMMONS ET AL

It is certified that error appears in the above-identified patent and that said Letters Patent is hereby corrected as shown below:

Column 12, line 7, correct "1.5%" to read -- 0.5% --.

Signed and Sealed this

Sixteenth Day of November, 1993

Attest:

BRUCE LEHMAN

*Attesting Officer*  *Commissioner of Patents and Trademarks*